Nov. 4, 1947.  C. W. HANSELL  2,430,013
IMPEDANCE MATCHING MEANS FOR MECHANICAL WAVES
Filed June 10, 1942  2 Sheets—Sheet 2
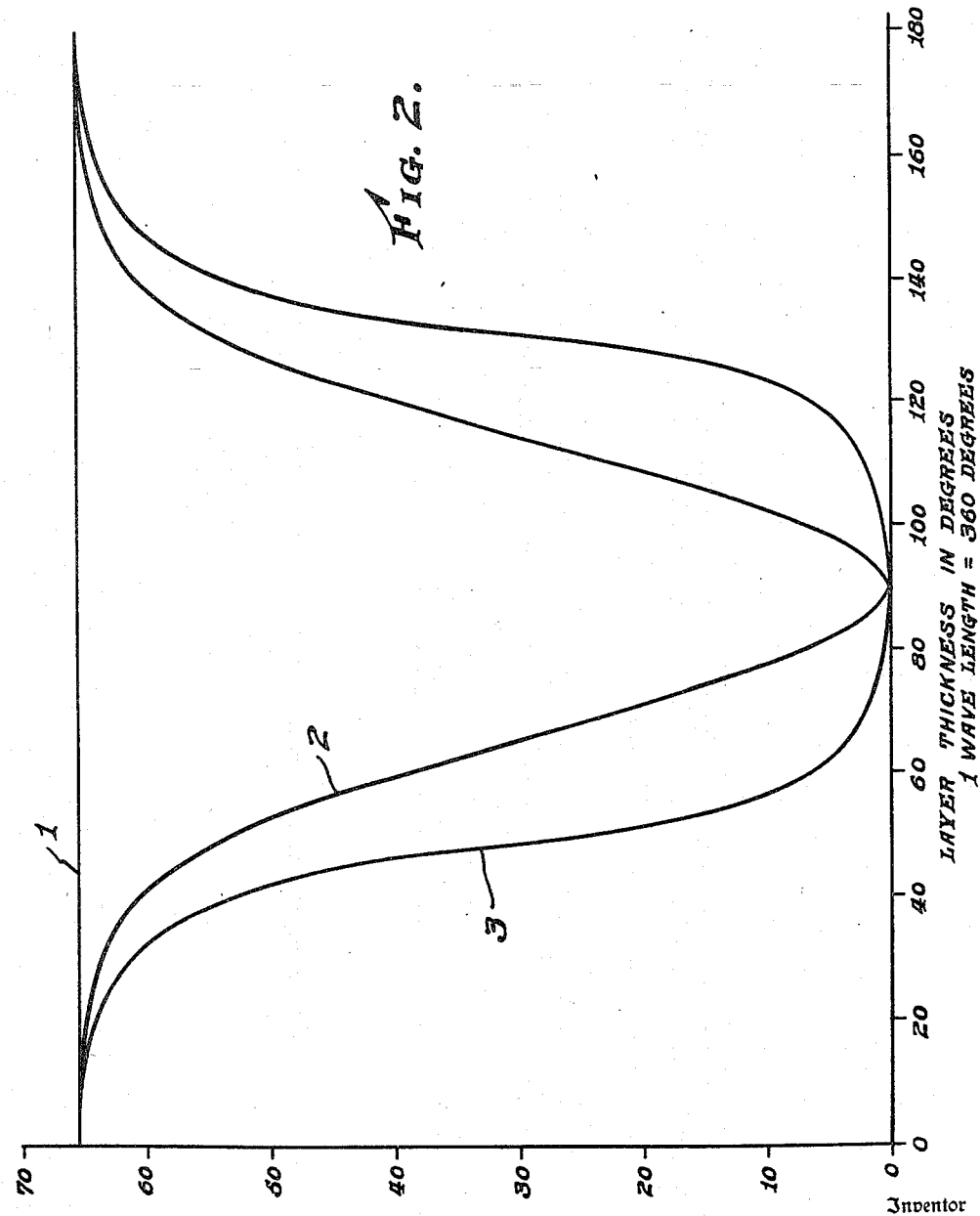
Inventor
Clarence W. Hansell
By
H.G. Grover
Attorney Patented Nov. 4, 1947

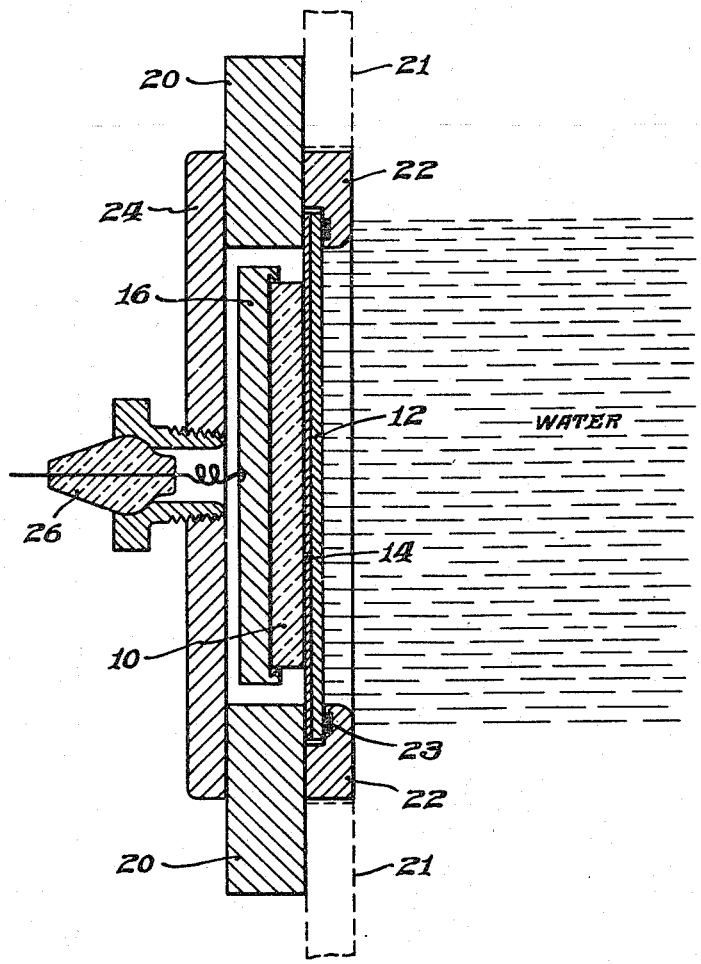

2,430,013

UNITED STATES PATENT OFFICE 2,430,013

IMPEDANCE MATCHING MEANS FOR MECHANICAL WAVES

Clarence W. Hansell, Rocky Point, N. Y., assignor to Radio Corporation of America, a corporation of Delaware Application June 10, 1942, Serial No. 446,474

6 Claims. (Cl. 177—386)

The present invention relates to means for transferring waves from one transmitting medium to another.

An object of the present invention is the reduction of mechanical wave reflections at the boundary between two media through which the waves pass.

Another object of the present invention is the reduction of wave reflections, over a broad band of frequencies, at the boundary between two media through which the waves pass.

Still another object of the present invention is the improvement of the coupling between a vibrating body and an adjacent medium with which it is in contact.

Still another object of the present invention is to improve the operation of ultra-sonic signalling systems.

Still a further object of the present invention is to improve the operation of sound wave signalling and detection systems.

When mechanical waves traveling through one medium encounter a boundary surface separating this medium from another medium of dissimilar characteristics a portion of the energy of the waves passes through the boundary surface and a portion is reflected. Assuming that the waves travel substantially perpendicularly to the boundary surface then the magnitude of the power reflected, expressed as a fraction of the power arriving at the boundary, is given by the relation:

$$R = \left(\frac{Z_1 - Z_2}{Z_1 + Z_2}\right)^2$$

where $Z_1$ and $Z_2$ are the wave impedances of the two media, respectively.

These wave impedances are each determined by the modulus of elasticity, M, and the mass density, D, of the material through which the waves pass according to the relation:

$$Z = \sqrt{MD}$$

In order that waves of all frequencies may pass from one medium to another with minimum reflection it is necessary that the media have like values of wave impedance. In practice, in the design and operation of devices employing mechanical waves it is frequently not practical to employ like wave impedances throughout all the media through which the waves pass and reflection usually takes place at the boundary surfaces.

It is possible, over a limited range of wave frequencies, to reduce the reflections to a very low value, if the two media on each side of a boundary are joined together through a layer of a third medium having a wave impedance which is the geometric mean of the wave impedances of the two media, provided the layer has a thickness close to an odd integral number of quarter waves, measured at the velocity of waves in the layer. Preferably, in order to minimize reflection over a larger band of frequencies, the layer should be only one quarter wave thick, for wave lengths in the layer at the wave frequency.

Expressed mathematically the wave impedance of the layer should be:

$$Z_l = \sqrt{Z_1 Z_2}$$

where $Z_1$ and $Z_2$ are the wave impedance of the media joined together by the layer.

The velocity, V, of waves in the layer is given by the relation:

$$V = \sqrt{\frac{M}{D}}$$

and a wave length in the layer is given by:

$$\lambda = \frac{V}{F}$$

where F is the frequency of the waves. The layer thickness is then preferably:

$$T = \frac{\lambda}{4} = \frac{V}{4F} = \frac{1}{4F} x \sqrt{\frac{M}{D}}$$

It is also useful to note that the wave impedance is obtainable when the density of the material and velocity of waves in it are known, through the relation:

$$Z = DV$$

To explain more or less crudely the reason why the quarter wave layer reduces reflections it may be noted that the original impedance change, from one medium to the other, before the layer is added, is divided up by inserting the layer, into two equal smaller ratio impedance changes separated by a distance equal to a quarter wave. As a consequence wave portions reflected at each junction are smaller than they would be for the case of a single junction and wave portions reflected by one junction travel backward toward the source of the waves with a phase relation which is opposed to wave portions reflected by the other junction so that the two reflected wave portions oppose and cancel out to zero, or to a very low value of reflection. Thus the quarter wave thick impedance matching layer, having a wave impedance equal to the geometric mean of the wave impedances of the two wave media joined by it, has the property of reducing reflection to a very low value as compared to the reflection which would exist if the media were joined directly.

For other wave frequencies, where the layer thickness is not a quarter wave, or an odd integral number of quarter waves, reflections at the two junctions are no longer directly opposed but, when added vectorially, result in an unbalanced component of wave reflection. This unbalanced component increases as the thickness of the layer departs from an odd integral quarter wave and becomes a maximum when the thickness is an even integral number of quarter waves. This maximum value of reflection, after the layer is added, is equal to the reflection which would exist if the layer were absent. Therefore, except for frequencies for which the layer thickness is an even integral number of quarter waves there is always some reduction in reflection but this reduction is often insufficient for waves whose frequencies are much different from the values which make the thickness an odd integral number of quarter waves.

Thus the foregoing method of impedance matching reduces reflections to a small value over an appreciable band of frequencies but often this band is not great enough to meet practical requirements. To very greatly broaden the frequency band through which reflections remain small, two quarter wave layers may be inserted between the two wave media in such a way as to perform the impedance transformation in two equal ratio steps, that is, if the two media have wave impedances of $Z_1$ and $Z_2$, then next to the medium with a wave impedance of $Z_1$, there should be placed a quarter wave layer of material with an impedance of:

$$Z_4 = \sqrt{Z_1 \sqrt{Z_1 Z_2}}$$

Then, next to the medium of a wave impedance of $Z_2$ and in contact with the first quarter wave layer is placed a second quarter wave layer having a wave impedance of:

$$Z_5 = \sqrt{\sqrt{Z_1 Z_2} Z_2}$$

By employing two wave impedance transforming layers in this manner, impedance matching and low reflection may be obtained over a very much broader band of frequencies than if a single layer is used.

To obtain a physical conception of the reasons why two layers provide an improved result we may picture the four surfaces of the two layers as four sources of equal amounts of reflection. The impedance change at each surface is half as much as if a single layer were used and only one fourth as much as if no layer were used to join the two principal wave media. This results in a corresponding reduction in the power intensity of reflected waves at each surface.

So long as each layer is not too far from being a quarter wave, or an odd integral number of quarter waves thick, the reflections from the two surfaces of each layer tend to oppose, more or less, and cancel out to a lower value for the resultant of both surfaces than for each surface alone.

Consider now that each layer, with its pair of surfaces whose reflections tend to balance, has an unbalanced residual reflection, due to imperfect balancing of reflections from its two surfaces. Considering these residual reflections from the two layers it will be noted that they also come from sources which are, in effect, separated by a quarter wave distance, more or less. Therefore the residuals from reflections at the pairs of surfaces of the two layers also tend to oppose and to give an overall resultant reflection which, over a broad band of frequencies, is much lower than if a single impedance matching layer were used.

The impedance transformation may be performed in any even number of steps or layers or, as an ultimate limit, by means of a continuously tapering wave impedance going from one medium to another. However, in most circumstances, a pair of impedance matching layers is sufficient.

The present invention will be more fully understood by reference to the following detailed description, which is accompanied by a drawing in which Figure 1 illustrates one embodiment of the present invention, as it might be applied in submarine signaling, while Figure 2 illustrates the effect of the invention in its application to the arrangement of Fig. 1.

The invention shown in the drawings may be applied to the problem of communication by means of supersonic waves in submarine signaling systems where an efficient transfer of power from transmitters to the water and from the water to the receivers over a relatively broad band of frequencies is desired. Also, the invention may be applied to light valves employed in large screen television receivers in which radio frequency currents modulated by television signals are impressed across a piezo-electric quartz crystal and cause it to expand and contract in accordance with the impressed currents. The crystal vibrations or oscillations are transferred to a liquid column in contact with the crystal. The waves then travel along the length of the liquid column and in so doing control the amount of light passing through the liquid in a direction at right angles to the direction of travel of the waves.

Referring now to Figure 1, I have shown therein a piezo-electric quartz crystal 10, across which may be applied a high frequency alternating current potential, for transmitting, or from which may be obtained alternating current potentials, in response to vibrational waves arriving through the sea water in front of the crystal. I have shown a steel base 20 upon which all parts are mounted. This disc may be bolted into a hole in the hull of a ship as indicated by plate 21, or into any additional mounting as required. Mounting ring 22 serves to clamp the working parts to the base 20, the whole being sealed water tight by gasket 23. A back plate 24 serves as a protection and as a mounting for insulating bushing 26 through which electrical connection is made to crystal electrode 16 for applying potentials across the crystal for transmission or for taking off potentials for reception.

Expressed in dyne-centimeter units the wave impedance of sea water is approximately 154,000 and the wave impedance of the quartz crystal is approximately 1,448,000. The ratio of their wave impedances is therefore about 9.4. This is a bad mismatch of impedance which will cause the crystal 10 to show resonance effects tending to limit the frequency band within which substantially equal response can be obtained in converting waves of electrical potential and current, applied to the crystal, into vibrational waves in the water, and vice versa.

By applying a layer of material which is a quarter wave thick, at a mean operating frequency, between the crystal and the water we may substantially prevent reflection of waves at the input surface of the layer, which, in the transmitting case, is the surface in contact with the crystal and which in the receiving case is the surface in contact with the water. At other frequencies, for which the layer thickness is more or less than a quarter wave, there will be reflection but the amount of reflection of the waves is always less than it would have been if no layer were used except for those frequencies which make the layer thickness either zero or an integral number of half waves thick. For these special values of frequency, or thickness, the reflection will rise to the same value as it would have been if the layer had been omitted so as to put the crystal in contact with the water.

In Fig. 2 I have shown the results of a partially mathematical and partially graphical analysis of the reflection obtained for various layer thicknesses expressed in degrees, where 90 degrees is a quarter wave length. This is equivalent to showing reflection versus frequency if we remember that the wave length is the wave velocity divided by its frequency.

Curve 1 of the figure shows the percentage of incident wave power reflected back into the crystal, or back into the water, when the layer is water, similar to the transmitting medium. Curve 2 shows the percentage of reflection when a layer of material having a wave impedance $$Z_l = \sqrt{9.4 \times 1} = 3.065$$

times the wave impedance of water is inserted between the water and the crystal. It will be noted that such a layer reduces the reflection to substantially zero when the thickness and wave frequency are such as to make the layer a quarter wave thick. For other thicknesses there is a reduction in reflection except where the thickness is zero or an integral number of half waves.

The wave impedance of the layer must be $Z_l = 154,000 \times 3.065 = 472,000$ approximately. In practice it is therefore necessary to find some suitable material, or to make it up, which has about this value of wave impedance. One possibility is to use Bakelite molded sheet, some forms of which have about the right value of wave impedance. One Bakelite material which might be used, for example, is listed as having a density of 1.2, a modulus of elasticity of $1.72 \times (10)^{11}$ dynes per square centimeter per centimeter and a vibrational wave velocity of 378,000 centimeters per second. Its wave impedance is therefore about 455,000, which is near enough to 472,000 to provide for reasonably good impedance matching when the layer is nearly a quarter wave thick. If the operating frequency is say 500,000 cycles per second then the thickness of material required for the single impedance matching layer will be about 0.189 centimeter or 0.0744 inch, approximately.

From Fig. 2 it may be seen that, if the device of Fig. 1 is to be used under conditions such that reflected waves must be kept below 10% in power, or 31.6% in amplitude, with respect to the incident waves, then the frequency range within which a single impedance matching layer is adequate will be that corresponding to layer thicknesses of about 78 to 102 degrees, or from say 575,000 down to 440,000 cycles per second, a total band of about 135,000 cycles having a midband frequency of approximately 500,000 cycles. While this may be adequate for many purposes there are other applications, such as in depthometers, obstacle detectors, etc., employing short pulses for which this band width would not be sufficient. In other cases the one piezo-electric quartz crystal transmitter-receiver unit may be employed for a multiplicity of purposes requiring a larger range of frequencies.

To secure a wider frequency band, in accordance with a principal object of the invention I employ two layers of material, instead of one, between the water and the crystal, so as to perform the impedance transformation in two equal ratio steps.

The layer next to the water will have a wave impedance with respect to water of:

$$Z_{l1} = \sqrt{1 \times \sqrt{9.4 \times 1}} = 1.75 \text{ approximately}$$

and the other will have a wave impedance with respect to water of:

$$Z_{l2} = \sqrt{9.4 \times \sqrt{9.4 \times 1}} = 5.37 \text{ approximately}$$

These two values of wave impedance, in dyne centimeter units, would then be:

$$Z_{l1} = 154,000 \times 1.75 = 270,000 \text{ approximately}$$

and $$Z_{l2} = 154,000 \times 5.37 = 828,000 \text{ approximately}$$

Materials which may be used to approximate these values of wave impedance are shagbark hickory wood and magnesium metal, respectively. The hickory wood has a wave velocity of about 412,000 centimeters per second so that, at 1,000,000 cycles per second the required thickness will be about 0.103 centimeter, or 0.0407 inch. The magnesium has a wave velocity of about 490,000 centimeters per second so that, at 1,000,000 cycles per second the required thickness will be about 0.1225 centimeter or 0.0483 inch.

As a consequence of employing two wave impedance transforming layers instead of one the reflection is reduced to a low value over a much broader band of frequencies, as indicated by curve 3 of Fig. 2. From curve 3 it will be seen that the range of thicknesses of the layers over which reflection remains below 10% in power, or 31.6% in amplitude, has been increased to about 57 to 123 degrees corresponding to a frequency range of about 260,000 to 685,000 cycles per second, or a total band of about 425,000 cycles. This is an improvement in band width of more than 3 to 1 by using two impedance transforming layers, instead of a single layer, for the conditions assumed.

In Fig. 1 the two wave impedance transforming layers are indicated at 12 and 14, interposed between the piezo-electric quartz crystal 10 and the sea water.

Since the piezo-electric quartz crystal tends to transmit vibrational waves in both directions through its surfaces it is desirable to apply some treatment to the back surface to minimize resonance effects there. One such treatment is to transform the wave impedance at the back surface to the wave impedance of an absorbing medium. This expedient is open to the objection that, although it is very effective in reducing resonance effects, it results in a large loss of wave power.

Another expedient which I prefer, and which is good enough for most purposes is to form electrode 16 of some conductive material which has a very large wave impedance and which is a quarter wave length thick for some mean frequency in the frequency band to be utilized. By this means the back surface of the crystal can be made to vibrate very little so that substantially all of the wave power is radiated through the layers 14 and 12 into the water, in the transmitting case, and very little wave power is lost in the receiving case. Among suitable materials having very high values of wave impedance are tungsten, rhodium, platinum, tantalum, nickel, steel and Monel metal.

It is, of course, necessary that the crystal 10 and the layers 12, 14 and 16 be joined together mechanically, at the surface. This may be done with very thin layers of adhesive cement having at least sufficient mechanical strength to withstand the tension and compression set up by the transmitted waves.

Another example of possible application of the present invention is in television receivers of the type developed by Scophony Laboratories in England. For descriptions of these receivers reference may be made to articles appearing in Proceedings of the Institute of Radio Engineers, vol. 27, No. 8, for August 1939 and to additional references cited there. In the Scophony television receiver a supersonic light control cell is used in which modulated waves set up in a piezo-electric quartz crystal are transferred to a liquid and, in the liquid, control the light used in projecting a light image.

As will be clear from the articles one of the difficult problems was to provide sufficiently wide frequency band width within which uniform response was obtained in the control of the light. Reflections at the crystal surfaces were so great that, in spite of its inefficiency and imperfect performance, selective side band (called single side band in the articles) was resorted to and even then the band width was barely sufficient for reproducing the images.

By applying the present invention to the light cells of the Scophony receivers, particularly the double layer impedance matching layers and the high wave impedance backing plate, as described in connection with Fig. 1, the band width of nearly uniform response of the light cell may be increased several fold. Then double side band working with its higher efficiency and lesser distortion may be used and, at the same time, the band of modulation frequencies may be widened.

For extremely broad frequency response bands still further improved results may be obtained in transferring vibrational waves from one medium to another if more than one pair of layers are used, all layers accomplishing substantially like impedance transformations. As an upper limit of perfection the layers may merge into the condition of gradual change of wave impedance, over a relatively great total thickness, with the impedance changing slowly from one value to another, along the direction of wave travel.

In applying the quarter wave impedance matching layers it is necessary to be able to choose materials having a suitable wave impedance. While materials may be chosen which inherently have the proper values of wave impedance, I prefer to utilize quarter wave layers of materials, the wave impedances of which may be adjusted to desired values. This may be done utilizing alloys and mixtures of materials in such proportions as to provide desired values of wave impedance. Where the wave amplitude is not too great I am able to employ a binder material such as methyl methacrylate resin, known as "Lucite," Bakelite, varnish, low melting point solder, aluminum, etc., to which has been added finely divided materials of higher or lower density and wave impedance as desired. The desired values of density, bulk modulus and velocity may be chosen from tables such as Smithsonian Tables 1934 reprint. The wave impedance may be calculated therefrom by the use of the equations given above. Some typical examples are hereafter given. For example, the methyl methacrylate resin may have added to it finely divided metal powders or powdered oxides of metals for increasing the wave impedance. Aluminum powder may be added to cause a small increase in impedance and dry powdered lead oxide for a larger increase in impedance. For lower impedances than that of the methyl methacrylate resin finely divided wood powder, cotton fiber or other materials which are lighter and more elastic than the resin may be mixed with the resin. Naturally, the adjustment of the resin or other binder material to a new value of impedance, by mixing in other materials, changes the velocity of the waves in the material. This, however, is not important since the material may always be cut or molded to a quarter wave thickness for the particular value of wave velocity obtained.

Alternatively I may build up the layers from thin laminations cemented together, so choosing the combination of materials as to obtain a desired effective wave impedance.

While I have particularly described several embodiments of the present invention as applied particularly to a supersonic signaling device and to a light control cell it is, of course, contemplated applying the principles of the invention to every possible case where it is desired to have mechanical or vibrational waves pass from one medium into another with a minimum of wave reflection over a broad band of frequencies.

*Typical mechanical vibration wave characteristics of selected materials*

| Material | Wave Impedance Z | Velocity, cm./sec. V | Density D | Bulk Modulus, dynes/cm.$^2$ M |
|---|---|---|---|---|
| Bromine | 74,800 | 23,400 | 2.187 | 0.01788 |
| Alcohol, Methyl | 109,600 | 135,400 | 0.810 | 0.00971 |
| Water (25° C.) | 148,066 | 148,500 | 0.997077 | 0.0220 |
| Castor Oil | 149,600 | 154,800 | 0.969 | 0.0217 |
| Potassium | 194,000 | 228,000 | 0.851 | 0.032 |
| Ice | 276,000 | 301,500 | 0.917 | 0.083 |
| Glass | 432,500 | 130,500 | 2.4 | 0.45 |
| Graphite | 864,000 | 384,000 | 2.25 | 0.330 |
| Aluminum | 1,422,000 | 528,000 | 2.7 | 0.75 |
| Lead | 2,235,000 | 197,000 | 11.347 | 0.44 |
| Copper | 3,450,000 | 386,500 | 8.9376 | 1.33 |
| Iron | 3,620,000 | 461,000 | 7.86 | 1.67 |
| Nickel | 4,500,000 | 512,000 | 8.8 | 2.3 |
| Tungsten | 8,440,000 | 438,000 | 19.3 | 3.7 |
| Platinum | 8,670,000 | 406,000 | 21.37 | 2.6 |

*Woods*

| Material | Derived Wave Impedance | Velocity, cm./sec. | Density | Bulk Modulus, dynes/cm.$^2$ |
|---|---|---|---|---|
| Ash (along rings) | 81,800 | 126,000 | 0.65 | 0.0103 |
| Ash (across rings) | 90,400 | 139,000 | 0.65 | 0.01256 |
| Fir, White (along fiber) | 162,200 | 464,000 | 0.35 | 0.075 |
| Sycamore (along fiber) | 178,500 | 446,000 | 0.4 | 0.0796 |
| Oak (along fiber) | 231,000 | 385,000 | 0.60 | 0.089 |
| Maple (along fiber) | 254,500 | 411,000 | 0.62 | 0.1045 |

I claim:

1. In combination with a pair of mechanical wave transmitting media having differing wave impedances of a plurality of layers of wave transmitting media between said first mentioned media, the thickness of each of said layers being equal to a quarter wave length at the frequency of the transmitted wave, the wave impedance of said layers being so related to the impedances of said first media that the impedance transformation between said first media takes place in nearly equal ratio steps.

2. In combination with a pair of mechanical wave transmitting media having different wave impedances $Z_1$ and $Z_2$, of a pair of layers of material interposed between said media, each layer having a thickness equal to a quarter wave length near the middle of a band of wave lengths to be transmitted, the layer next to the medium of the impedance $Z_1$ having a wave impedance:

$$Z_3 = \sqrt{Z_1\sqrt{Z_1 Z_2}}$$

the other of said layers having a wave impedance $$Z_4 = \sqrt{Z_2\sqrt{Z_1 Z_2}}$$

3. In combination with a pair of mechanical wave transmitting media having differing wave impedances of a number of layers of wave transmitting media between said first mentioned media, the thickness of each of said layers being equal to a quarter wavelength at the frequency of the transmitted wave, the wave impedance of said layers progressively decreasing in the direction from the medium of said pair having the higher wave impedance toward the other of said pair.

4. In combination with a pair of mechanical wave transmitting media having differing wave impedances of a number of layers of wave transmitting media between said first mentioned media, the thickness of each of said layers near the middle of a band of wavelengths to be transmitted being equal to a quarter wavelength, the wave impedance of said layers progressively decreasing in the direction from the medium of said pair having the higher wave impedance toward the other of said pair.

5. In combination with a pair of mechanical wave transmitting media having differing wave impedances of a number of layers of wave transmitting media between said first mentioned media, the thickness of each of said layers being equal to a quarter wavelength at the frequency of the transmitted wave, the wave impedance of said layers decreasing in a geometric progression in the direction from the medium of said pair of media having the higher wave impedance toward the other medium of said pair.

6. In combination with a pair of mechanical wave transmitting media having differing wave impedance of a pair of layers of wave transmitting media between said first mentioned media, the thickness of each of said layers being equal to a quarter wavelength at the frequency of the transmitted wave, the wave impedance of said layers being so related to the impedances of said first media that the impedance transformation between said first media takes place in nearly equal ratio steps.

CLARENCE W. HANSELL.

REFERENCES CITED

The following references are of record in the file of this patent:

UNITED STATES PATENTS

| Number | Name | Date |
| --- | --- | --- |
| 2,207,656 | Cartwright et al. | July 9, 1940 |
| 2,283,285 | Pohlman | May 19, 1942 |
| 2,384,465 | Harrison | Sept. 11, 1945 |

FOREIGN PATENTS

| Number | Country | Date |
| --- | --- | --- |
| 466,212 | Great Britain | May 21, 1937 |